E. BOURDELLES.
STABILIZING AEROPLANES.
APPLICATION FILED OCT. 31, 1910.

1,030,968.

Patented July 2, 1912.

3 SHEETS—SHEET 1.

Witnesses:
Edw. S. Dubois
Ed. O'Rosell

Inventor
Emile Bourdelles
by his Attorneys

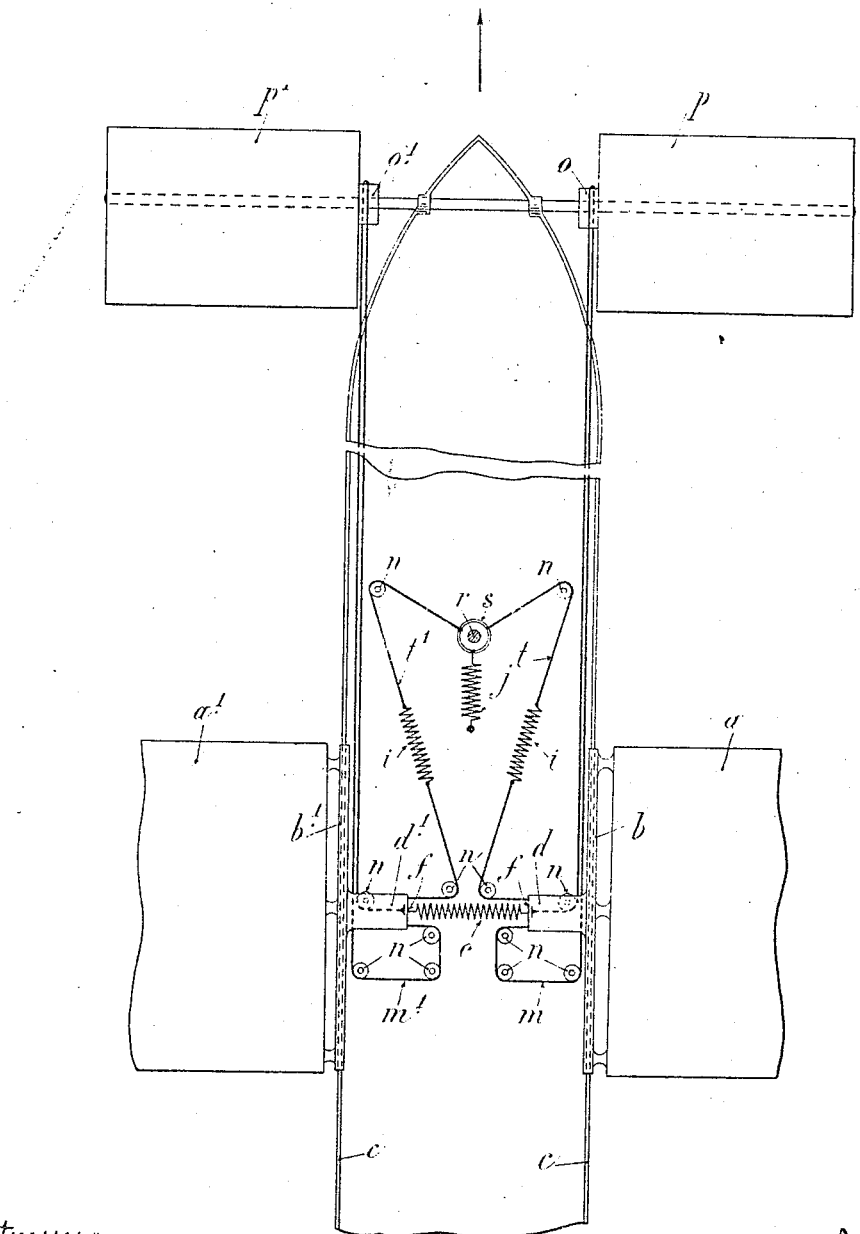

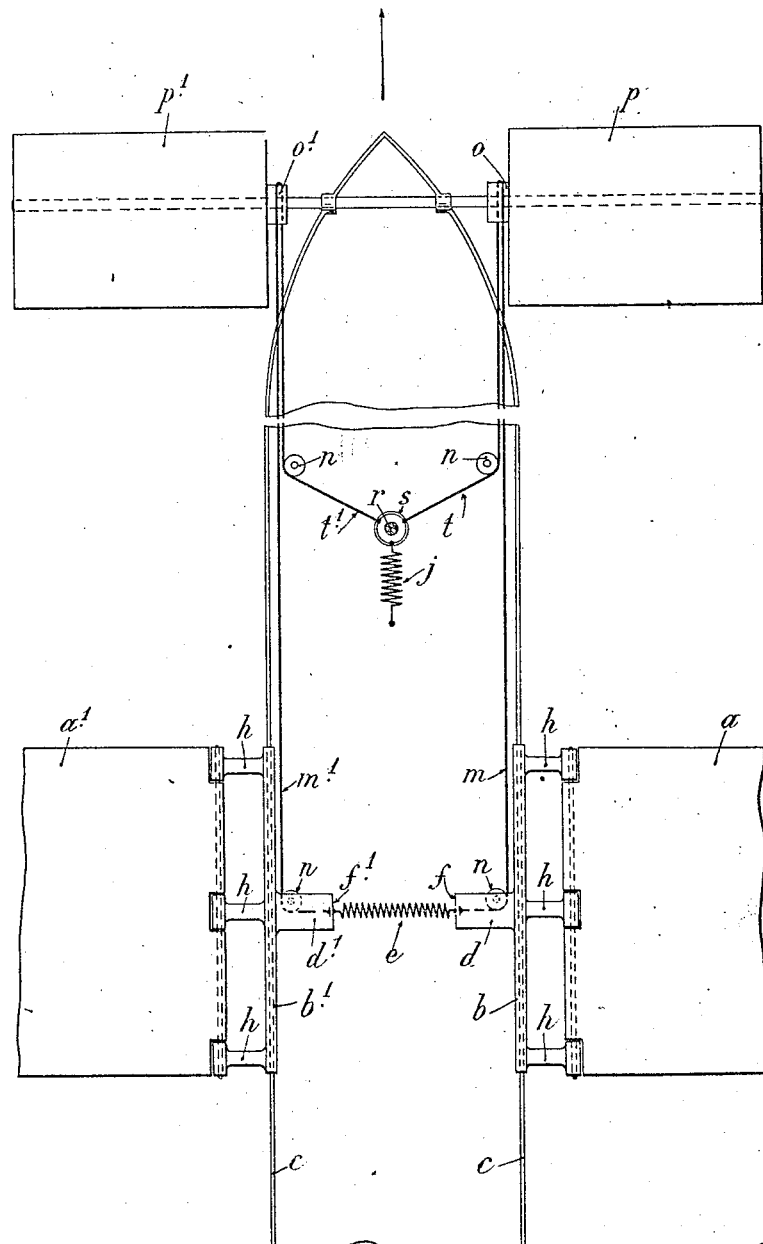

UNITED STATES PATENT OFFICE.

EMILE BOURDELLES, OF PARIS, FRANCE.

STABILIZING AEROPLANES.

1,030,968. Specification of Letters Patent. Patented July 2, 1912.

Application filed October 31, 1910. Serial No. 589,881.

*To all whom it may concern:*

Be it known that I, EMILE BOURDELLES, citizen of the Republic of France, residing at 39 Rue Galilée, Paris, France, have invented certain new and useful Improvements in Stabilizing of Aeroplanes, of which the following is a specification.

The stability of aeroplanes is obtained at present in an approximate manner by means of a good distribution of the surfaces, attained preferably by stabilizing systems of pendulums or gyroscopes which are defective the first owing to their lack of sensitiveness and the latter owing to their complication. These methods moreover are not sufficient in themselves to insure a good value for the angle of attack which alone enables in aeroplanes of constant surface the obtaining of a permanent condition of flight at different speeds. For example an aeroplane having an angle of attack of 6° for the speed of 60 kilometers per hour, should have an angle of attack of about 3° at 85 kilometers and 1° 30 minutes at 120 kilometers because the quantity $KSV^2$ sin. A (A being the angle of attack) should remain equal to the total weight. If the adjusting of the angle of attack is left entirely to the skill of the pilot the speed of the air-ship is practically limited to that required for soaring or flight, owing to the impossibility of obtaining by hand angles which vary for each speed of running within such narrow limits.

The device according to the present invention has for object to enable the angle of incidence to be automatically adjusted to the value corresponding to the speed of the air-ship at any instant. When the supporting planes are caused to rise by increased air pressure thereon they operate suitable means, hereinafter described, by which the angle of incidence of the front rudders is decreased, and conversely, if the pressure on the sustaining planes is below a predetermined normal the angle of incidence of the front rudders is increased, so that the general angle of the aeroplane to the horizon is kept normal throughout the time of flight. It therefore insures longitudinal stability and at the same time if desired transverse stability.

Figure 1:
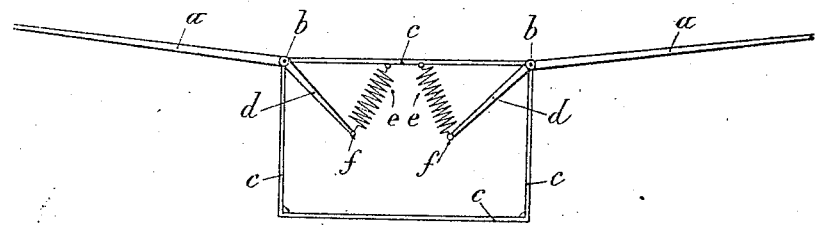
Figure 2:
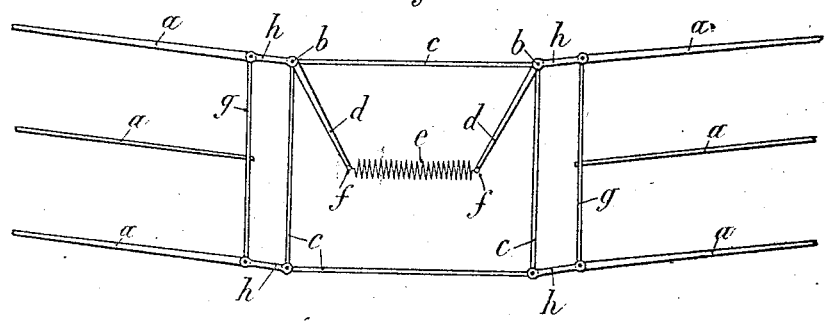
Figure 4:
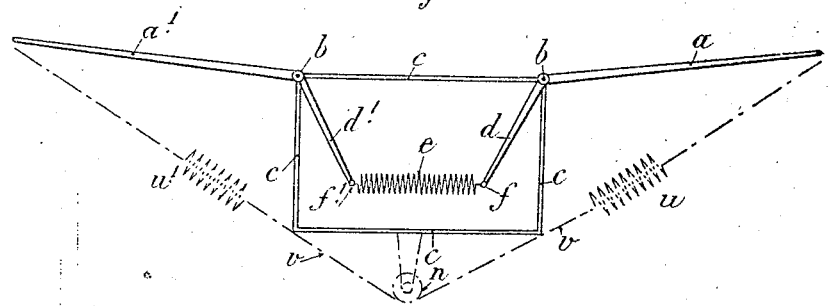
Figure 6:
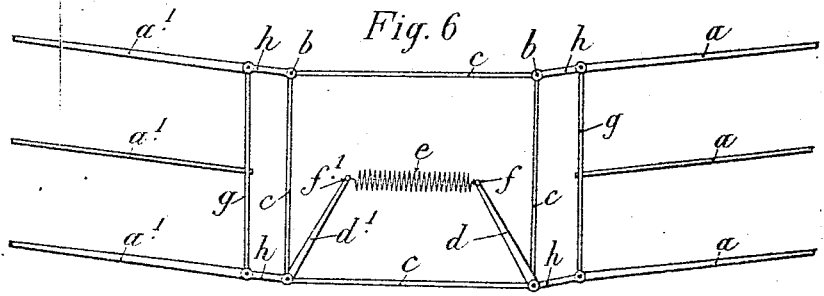

In the accompanying drawings, Figures 1 and 2 are diagrammatic transverse sections of two constructional forms of the invention. Fig. 3 is a diagrammatic sectional plan showing the detail of the transmission of movements used in carrying out the invention. Fig. 4 is a corresponding transverse section. Fig. 5 is a diagrammatic sectional plan of a modification of the transmission. Fig. 6 is a corresponding transverse section.

As shown in Fig. 1 each of the planes $a$ is jointed at $b$ to its point of connection to the frame $c$, and extended by a lever $d$ acted on by a spring $e$ in the direction producing lowering of the plane. This spring may be arranged to work in extension or compression. The ends $f$ of the levers $d$ each actuate through the agency of connecting cables or rods an elevating rudder situated on the same side as the lever with respect to the frame when the rudder at the front of the frame, or on the opposite side, when the rudder is fitted at the back of the frame. The effect produced is the following. In permanent running each plane experiences from the air a vertical reaction equal to half the weight of the apparatus. If the pilot increases the speed of flight of the aeroplane the sustaining reaction on the planes ($KSV^2$ sin. A) increases but then the planes rising slightly the levers $d$ are lowered and actuating the elevating rudders (diminishing their angle of attack if they are in front) diminish the general angle of the aeroplane to the horizon and consequently the angle of incidence of the planes. The sustaining reaction is thus brought back to the desired value. The inverse effect is produced if the speed decreases or if for any cause the incidence of the planes and consequently their upward thrust should become too weak. The oscillations of the springs $e$ may be damped in any known manner. In the same way if the speed of one of the planes only relative to the wind should vary, in consequence of an eddy for example, the effect of which would tend to capsize the aeroplane laterally, this plane would actuate the elevating rudder on its side which owing to its non-symmetrical reaction would right the aeroplane thus insuring automatic transverse stability.

If transverse stabilization is not desired, the hereinbefore described apparatus provided with two independent rudders may be used to actuate a single rudder placed at the front or at the back.

In the case of air-ships with several supporting surfaces, or even for certain monoplanes it may be of advantage to form the connection of the planes with the frame by several sets of rods as illustrated in Fig. 2. The superposed planes $a$ are by means of a standard jointed to two or several rods $h$ which are themselves jointed on a standard of the frame $c$ in such a manner that this standard, the standard $g$ and the said rods $h$ form a jointed parallelogram. The levers $d$ for actuating the elevating rudder are then integral with one of the sets of rods $h$.

To enable the aviator to vary at will and during flight the tension of the springs $e$ (on which depends the amount of the lifting power automatically stored by each plane) the tension of these springs may be altered by the pilot in the manner done in the regulation of motor-cars, either by displacing the point of attachment of the springs or by means of an auxiliary or opposing spring which can be more or less stretched. By way of example Fig. 3 shows in diagrammatic plan the actuation of the stabilizing device described above. In the hypothesis of the figure if the right plane $a$ jointed about a longitudinal axis $b$ on the frame, tends to lift up, the lever $d$ rigidly connected to this plane will tend to lower; its end $f$ tends therefore to displace itself to the right. An endless wire $m$ guided on pulleys $n$ and passing over a drum $o$ rigidly connected to the elevating rudder $p$, will tend to point the latter downwardly. If the left plane $a^1$ should also tend to lift up owing to increasing speed of the air-ship as a whole the corresponding lever $d^1$ would point the left elevating rudder $p^1$ in the same direction as rudder $p$. The aeroplane as a whole would therefore have a diminished angle of attack. If on the other hand the right plane $a$ only receives too great a vertical reaction caused by eddies of air tending to destroy transverse equilibrium the end $f$ would move to the right exerting pull on the cable $m$, thus revolving the right drum $o$ and with it the rudder $p$, thereby pointing the front edge of the right rudder $p$ downwardly. At the same time the spring $e$ connecting the two levers $d$ $d^1$ would move the end $f^1$ a similar amount to the right thus causing the left rudder $p^1$ to lift, by the action of the cable $m$ revolving the drum $o$ and the rudder $p^1$ in a direction to raise the forward edge of the latter. The two rudders thus produce a righting couple in the perpendicular plane of the major axis of the aeroplane which couple would tend to restore equilibrium. To enable moreover the pilot to himself actuate at will the elevating rudders, the column $r$ supporting the steering wheel, passes through a ring $s$ attached to wires $t$ $t^1$ with restoring springs $i$ interposed, and a spring $j$. If the pilot moves the steering column and consequently the ring $s$ to the left or to the right, he creates a transverse couple tending to incline the aeroplane to the left or to the right. If he moves the ring $s$ in a fore or aft direction he points the nose of the aeroplane or makes it lift upward.

Fig. 5 shows another system of control of simplified type where the automatic actuating wires $m$ of the levers and the wires $t$ actuated by the pilot are in the same system.

The device described may obviously be modified in detail. For example instead of jointing each of the supporting planes $a$ to a corresponding longitudinal axis $b$ $b^1$ they could be jointed about a common hinge $b$ situated in the plane of the longitudinal axis of the air-ship. Again the spring $e$ may as shown in chain dotted lines in Fig. 4 be assisted or even replaced by one or two springs $u$ $u$ interposed in a cable $v$ fixed to the two planes and passing over a pulley $n$ situated at the lower part of the frame of the air-ship. It is also obvious that the automatic actuation of the elevating rudders by oscillation of the sustaining surfaces may be obtained by a transmission between auxiliary supporting surfaces such as ailerons, the wings proper being then independent of the said rudders.

The oscillating surfaces instead of being connected to elevating planes may equally well be connected to cells. The end $f$ of the levers $d$ may also be connected to the actuating mechanism for the warping of the planes so that an automatic warping would result as well as a variation in the vertical thrust or in the lifting power. Lastly the connection between the oscillating surfaces and the member which they control, instead of being made through a direct transmission may contain an intermediary mechanism such as a servo-motor.

Having now described my invention what I claim as new and desire to secure by Letters Patent is:—

1. In air ship embodying therein like supporting planes at each side thereof, each of said supporting planes being vertically, oscillatable about an axis extending in the direction of flight, elevating rudders, and connections between said planes and said rudders whereby displacement of said planes will automatically operate to correspondingly displace said rudders and maintain the longitudinal and lateral stability of the airship.

2. An air ship embodying therein like supporting planes at each side thereof, each of said supporting planes being vertically, oscillatable about an axis extending in the direction of flight, a flexible member connected to the oppositely disposed end of each supporting plane, elevating rudders, and connections between said planes and said rudders whereby displacement of said planes will automatically operate to correspondingly displace said rudders and maintain the longitudinal and lateral stability of the airship.

In testimony whereof I have affixed my signature in presence of two witnesses.

EMILE BOURDELLES

Witnesses:
　HENRI MONIN,
　H. C. COXE.